US010623995B2

(12) United States Patent
Montsma et al.

(10) Patent No.: US 10,623,995 B2
(45) Date of Patent: *Apr. 14, 2020

(54) DYNAMIC LOAD BALANCING OF SATELLITE BEAMS

(71) Applicant: GOGO LLC, Chicago, IL (US)

(72) Inventors: David J. Montsma, Wheaton, IL (US); Erhard G. Trudrung, Lake Barrington, IL (US); Paul J. Powers, Naperville, IL (US); Marc A. Nesheim, Lake Zurich, IL (US)

(73) Assignee: GOGO LLC, Chicago, IL (US)

( * ) Notice: Subject to any disclaimer, the term of this patent is extended or adjusted under 35 U.S.C. 154(b) by 145 days.

This patent is subject to a terminal disclaimer.

(21) Appl. No.: 15/844,055

(22) Filed: Dec. 15, 2017

(65) Prior Publication Data

US 2019/0191334 A1 Jun. 20, 2019

(51) Int. Cl.
*H04W 28/08* (2009.01)
*H04B 7/204* (2006.01)
(Continued)

(52) U.S. Cl.
CPC ...... *H04W 28/085* (2013.01); *H04B 7/18506* (2013.01); *H04B 7/18508* (2013.01);
(Continued)

(58) Field of Classification Search
CPC .............. H04B 17/407; H04B 7/18506; H04B 7/18508; H04B 7/18547; H04B 7/2041; H04W 16/28; H04W 28/085
See application file for complete search history.

(56) References Cited

U.S. PATENT DOCUMENTS 7,187,927 B1    3/2007 Mitchell
9,748,989 B1 *  8/2017 Freedman ................ H04B 1/12
(Continued)

FOREIGN PATENT DOCUMENTS

WO    WO-2018081870 A1 *  5/2018 ......... H04B 7/18508

OTHER PUBLICATIONS

International Application No. PCT/US2018/064817, International Search Report and Written Opinion, dated Mar. 1, 2019.

*Primary Examiner* — Un C Cho
*Assistant Examiner* — Shah M Rahman
(74) *Attorney, Agent, or Firm* — Marshall, Gerstein & Borun LLP; Randall G. Rueth

(57) ABSTRACT

A dynamic satellite load balancing system measures geographic position and travel information of in-flight aircraft in a fleet of aircraft equipped to establish in-flight connectivity services from a plurality of satellite beams. The in-flight aircraft include an on-board satellite map program with satellite map parameters to indicate which satellite beam of a group of available satellite beams is the most desirable based on the in-flight aircraft's geographic location. The system selects in-flight aircraft, determines load balanced satellite map parameters for the selected aircraft, and transmits the load balanced satellite map parameters to the aircraft to assemble load balanced satellite map programs to relieve wireless data communication saturation conditions on one or more of the satellite beams. The dynamic satellite load balancing system may transmit the load balanced satellite map parameters over an existing satellite data connection to make up-to-date adjustments to the communications load among the group of available satellite beams.

20 Claims, 9 Drawing Sheets

(51) Int. Cl.
*H04B 7/185* (2006.01)
*H04B 17/40* (2015.01)
*H04W 16/28* (2009.01)

(52) U.S. Cl.
CPC ....... *H04B 7/18547* (2013.01); *H04B 7/2041* (2013.01); *H04B 17/407* (2015.01); *H04W 16/28* (2013.01)

(56) References Cited

U.S. PATENT DOCUMENTS

| | | | | |
|---|---|---|---|---|
| 2003/0045289 | A1* | 3/2003 | Zhao | H04B 7/18539 455/435.1 |
| 2004/0133914 | A1* | 7/2004 | Smith | H04N 7/17318 725/86 |
| 2009/0245176 | A1* | 10/2009 | Balasubramanian | H04W 48/20 370/328 |
| 2010/0061293 | A1* | 3/2010 | Schiff | H04B 7/18513 370/316 |
| 2011/0032149 | A1* | 2/2011 | Leabman | H01Q 1/246 342/368 |
| 2011/0196564 | A1* | 8/2011 | Coulmeau | G08G 5/0039 701/26 |
| 2014/0045420 | A1* | 2/2014 | Tong | H04B 7/18506 455/12.1 |
| 2014/0119409 | A1* | 5/2014 | Arcidiacono | G01S 1/72 375/144 |
| 2015/0229385 | A1 | 8/2015 | Roos | |
| 2015/0358072 | A1* | 12/2015 | Lynch | H04B 7/18508 370/317 |
| 2016/0119938 | A1* | 4/2016 | Frerking | H04W 72/10 370/316 |
| 2016/0234281 | A1 | 8/2016 | Padmanabhan et al. | |
| 2016/0360280 | A1* | 12/2016 | Kits Van Heyningen | H04N 21/41422 |
| 2017/0126625 | A1* | 5/2017 | Haak | H04B 7/18506 |
| 2017/0230104 | A1* | 8/2017 | Purkayastha | H04B 7/18541 |
| 2018/0234166 | A1* | 8/2018 | Peponides | H04L 43/0882 |
| 2018/0332522 | A1* | 11/2018 | Axmon | H04W 36/32 |
| 2019/0044611 | A1* | 2/2019 | Treesh | H04B 7/18508 |

* cited by examiner

DYNAMIC LOAD BALANCING OF SATELLITE BEAMS

BACKGROUND

In-flight connectivity services may be provided to in-flight aircraft via satellite connectivity technology, such as SwiftBroadband™, Ku-band, Ka-band, Ground-to-Orbit, 2Ku, and others. With these technologies, in-flight aircraft are equipped with satellite antennas to open a data connection with an orbiting communications satellite via an on-board modem to provide in-flight connectivity to end-users on the aircraft. Individual orbiting communications satellites have a limited capacity for providing in-flight connectivity, and can become saturated with connections, thus lowering the level of service available to connected in-flight aircraft.

SUMMARY OF THE DISCLOSURE

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

DETAILED DESCRIPTIONS

Figure 1:
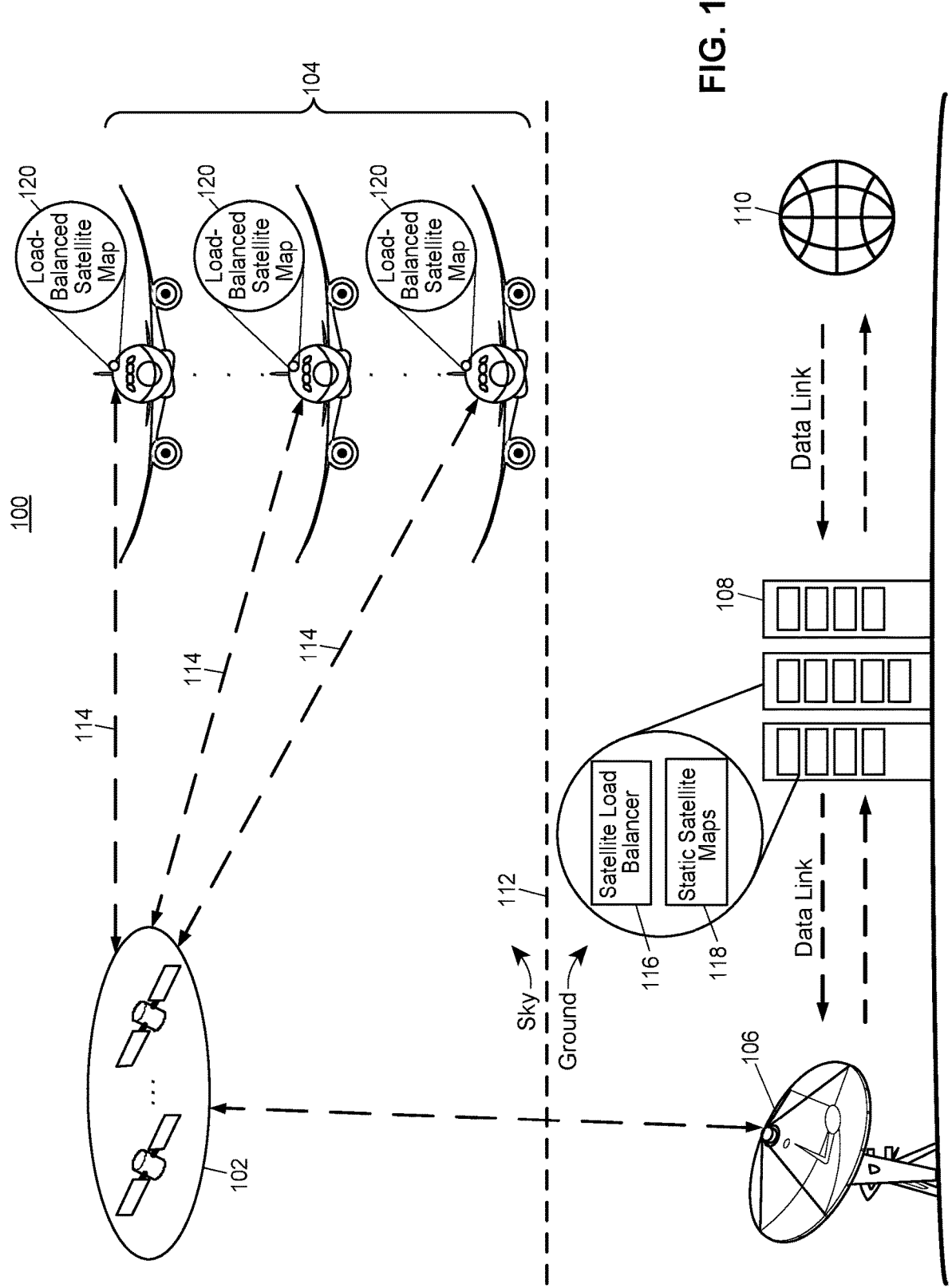
FIG. 1 is a schematic diagram of an example system for load balancing a plurality of satellite beams providing in-flight connectivity to a plurality of in-flight aircraft.

Communication systems that provide in-flight connectivity to aircraft over a satellite connection can become complex, with each network consisting of tens or hundreds of satellite beams supplied by multiple communications satellites. For an aircraft to determine which beam out of a large number of potential beams with which the aircraft should connect to access in-flight connectivity services, the aircraft must possess certain information regarding the various satellite beams. In-flight aircraft must know which beams cover which geographic areas as well as other information regarding the beam such as the beam's connection transmission intensity, the relative strength of the beam at various points within the beam's geographic area, the satellite location, the satellite transponder frequency, etc.

One way for in-flight aircraft to obtain the information needed to select a satellite beam for connection is for the aircraft to maintain a static satellite map program (and an application configured to read the satellite map program) including information regarding the various satellite beams. Static satellite maps are often received or updated by aircraft only at certain locations, such as when the aircraft are connected to a data link on the ground. Static satellite maps are therefore limited in terms of the timeliness of the information they can provide regarding the state of the in-flight connectivity. For example, a static satellite map program may not include newly added satellite beams or may include satellite beams that are down for maintenance (planned) or due to teleport outages (unplanned). In-flight aircraft may waste time attempting to connect to unavailable satellite beams or may connect to a satellite beam that is not an optimal or preferred beam for delivery of in-flight connectivity service to the aircraft or for the network as a whole. Aircraft may therefore experience gaps in in-flight connectivity service or service levels that are not as high as they could be if the aircraft knew to connect to different satellite beams. In other words, in-flight aircraft relying on static satellite maps can be thought of as "flying blind" to a degree with respect to the current state of a set of satellite beams because the static satellite map lacks up-to-date information regarding the state of the satellite beams.

Instead of relying only on static satellite maps, an in-flight connectivity provider network includes a ground station that is capable of determining and communicating dynamic changes to a static satellite map to in-flight aircraft over existing data connections to create on-board updated satellite maps (e.g., load balanced satellite maps). Dynamically changing the parameters of satellite maps on-board in-flight aircraft allows an in-flight connectivity provider network to effectively manage and load-balance the resources available to the network from a central location, even as network conditions change while connected aircraft are in the air. Updated or load balanced satellite map parameters need not be queued for distribution to aircraft only at certain times (e.g., when the aircraft has access to a network connection when grounded, undergoing routine maintenance, etc.). Instead, updates to the satellite map parameters may be made and distributed to a fleet of aircraft continuously as in-flight connectivity network conditions change over time.

Throughout this disclosure, reference is made to a satellite and a satellite beam interchangeably. In other words, if a system component or an operation is directed to connecting to "a satellite," the disclosure should also be construed alternatively, or additionally, to mean the system component or operation is directed to connecting to a communications beam emanating from a satellite and vice versa.

FIG. 1 is a schematic diagram of an example system 100 for load balancing a plurality of satellite beams 114 providing in-flight connectivity to a fleet of in-flight aircraft 104. FIG. 1 is generally divided into components above line 112 that are in-flight or in-orbit and components below line 112 that are located on the ground. As illustrated in the example of FIG. 1, the in-flight aircraft in the fleet of aircraft 104 assemble load balanced satellite map programs 120 that are more up-to-date than a static satellite map program. A load balanced satellite map program has the same or similar content as a static satellite map program (list of satellite beams, satellite beam connection information, etc.) except the parameters used to select a satellite beam have been updated by in-flight connectivity network station 108.

A satellite map program (e.g., a static satellite map program, a satellite map program with updated and/or load balanced parameters, etc.) may contain a list of satellite beams and other information relating to data connections with the beams including satellite vendor information, EIRP and G/T files, regulatory (no-transmit) zone polygons, adjacent satellite interference, elevation data, business reasons (e.g., E172A over Russia), etc. A static satellite map program may include satellite map parameters that effectively give weights to the various beams depending on factors such as the present geographical location of the aircraft. An in-flight aircraft may then select a beam with a high, or the highest, weighted value of the various available satellite beams. In one implementation, the static satellite map program may be viewed as a geolocation lookup table that shows which satellite beams cover which locations and the desirability of each satellite beam in each location.

Since the desirability of a satellite beam changes as the in-flight aircraft's location changes, the relative desirability of the satellite beams will change as the aircraft progresses along its route. At some point along its route, an aircraft will near the edge of a connected satellite beam's range and it will be advisable for the aircraft to switch to a more attractive satellite beam to prevent a gap in service or diminishment of the quality of service.

The aircraft in the fleet of in-flight aircraft control an on-board modem to connect to one of a plurality of communications satellites 102 via a satellite beam 114. The connection over satellite beam 114 provides in-flight connectivity to the aircraft in the fleet of aircraft 104 via a wireless connection between the satellite in the group of satellites 102 and a teleport 106. The teleport 106 is communicatively connected to a ground station 108, which is in turn communicatively connected to another network 110, such as the Internet or another public- or private-switched packet network or another type of network.

Once an aircraft in the fleet of aircraft 104 has established a communications connection with the in-flight connectivity network station 108, the aircraft may receive updates (e.g., updated and/or load balanced map parameters) to the aircraft's static satellite map program. The in-flight connectivity network station 108 may make ongoing, up-to-the-minute adjustments to satellite map parameters that it sends to the aircraft in the fleet of aircraft 104. When an aircraft in the fleet of aircraft 104 receives updated or load balanced satellite map parameters from the in-flight connectivity network station 108, the in-flight aircraft updates the aircraft's local satellite map program to include the new satellite map parameters, thus creating a load balanced satellite map program 120. In one implementation, the in-flight connectivity network station 108 sends only load balanced satellite map parameters to an in-flight aircraft in the fleet of aircraft 104. In another implementation, the in-flight connectivity network station 108 may transmit a complete new satellite map program to an aircraft in the fleet of aircraft 104 to replace a static on-board satellite map program with the load balanced satellite map program 120.

The in-flight connectivity network station 108 may create load balanced satellite map parameters for certain in-flight aircraft in the fleet of aircraft 104 connected to the satellites 102 or it may create custom load balanced satellite map parameters for a subset of the fleet of aircraft 104 or for a single aircraft in the fleet of aircraft 104. The in-flight connectivity network station 108 may therefore load-balance a communications load of the fleet of aircraft 104 across available communications satellites 102 and available satellite beams 114. If a satellite in the group of satellites 102 becomes saturated with communications connections at a peak time, the in-flight connectivity network station 108 may elevate the priority of a secondary beam 114 that covers a common area to the saturated beam by transmitting updated load balanced satellite map parameters to some of the in-flight aircraft in the fleet of aircraft 104.

Aircraft connected to the satellites 102 will likely vary in terms of demand for satellite connection services and thus demand on the satellite beams to which they are connected. Larger aircraft with more passengers may be likely to supply more in-flight connectivity customers, but demand may drop sharply in some situations, such as when the aircraft is flying late at night and some passengers are sleeping. Aircraft may be assigned weighting values based on an expected satellite beam load for the aircraft, but the weighting values may not always reflect the true demand for an aircraft. When there is a gap between the expected and actual satellite beam demand for a group of aircraft, the satellite beams to which the aircraft are connected may become saturated unless the satellite beam load can be rebalanced.

One way to load-balance the communications load across the satellite beams 114 is to detect whether a satellite beam satisfies a saturation condition and adjust satellite map parameters accordingly to reduce the saturation of that beam. In one implementation, a saturation condition is satisfied if more than a target number of aircraft are connected to the satellite beam 114 at one time. In another implementation, a saturation condition is satisfied when the relative number of aircraft connected to a satellite beam is more than the number of aircraft connected to other satellite beams emanating from the satellites 102. The relative saturation condition of a particular satellite beam may be satisfied if the number of connections to that beam is greater than the average number of connections to other beams by a predetermined factor. In yet another implementation, the saturation condition is satisfied for a satellite beam if the bandwidth requested by connecting aircraft exceeds a target value. In yet another implementation, the saturation condition is satisfied if the upload and/or download connection speeds experienced by aircraft connected to a satellite beam 114 fall below a target value. A saturation condition may also be satisfied in other ways, including without limitation if an in-flight network connectivity provider wishes to rearrange the connections 114 between in-flight aircraft and satellites 102 to satisfy any operational parameters and a particular satellite 102 has more connections with in-flight aircraft than desired according to the operational parameters.

Satellite beams 114 may also have saturation values wherein the level of saturation experienced by the beam is quantified by an assigned value. Satellite beams 114 may then be prioritized for de-saturation according to the level of saturation experienced by each beam. Relatively more saturated beams may therefore be de-saturated before less saturated beams.

There are several ways an in-flight connectivity network station 108 may adjust satellite map parameters to load balance communications sessions over the satellite beams 114. In one implementation, the in-flight connectivity network station 108 may transmit new load balanced satellite map parameters to aircraft that will enter the saturated satellite beam's region in the near future. The new load balanced satellite map parameters may elevate another satellite beam 114 to a higher priority than the saturated satellite beam's priority such that when new aircraft in the fleet of aircraft 104 enter the saturated satellite beam's zone, the aircraft will instead attempt to connect to a secondary satellite beam 114 instead of the saturated satellite beam. In this case, there will be a hysteresis period during which the satellite beam 114 may remain saturated until enough aircraft switch away from the beam.

In some implementations, the in-flight connectivity network station 108 applies a hysteresis mechanism to determine whether to update map parameters to switch a particular aircraft from one satellite beam to another. If the beam to which an in-flight aircraft is connected is not as attractive as another satellite beam available to the aircraft, then switching beams may provide an increase in performance to in-flight customers on the aircraft. Switching satellite beams, however, may also cause a degradation of service due to a temporary outage in network connectivity while the modem is switching beams. The length of the outage in network connectivity may depend on the distance between the aircraft and the edge of a coverage zone of the satellite beam. Typical temporary outages range from 10 seconds to one minute. Near the edges of the coverage zone, a break in service may be substantially longer than near the interior of the coverage zone. It may therefore be the case that switching satellite beams is overall not worth the switch due to balancing the increased quality of the available beam against the break in service due to switching.

One way for the in-flight connectivity network station 108 to determine whether a switch is worth a potential in-flight connectivity disruption is to assign a desirability value to satellite beams. The desirability value may depend on factors such as an expected signal-to-noise ratio of the beam when connected to by an aircraft at a particular location. A temporary outage in network connectivity may also be assigned a desirability value (e.g., a negative value) for comparison to the desirability value expected after a switch. After applying a desirability value of the cost of switching to a potentially available satellite beam, the in-flight connectivity network station may determine that quality of service would benefit more from not switching beams. In another implementation, a desirability level of an available beam must exceed the desirability value of a connected beam by a fixed margin (e.g., a margin determined in advance) before the in-flight connectivity network station 108 will determine a load balancing switch should be made. In particular, if an aircraft is flying along the boundary of two beams, then there is a risk the aircraft might switch back and forth repeatedly between the two beams. Applying a desirability value to the temporary outage requires that a new satellite beam be significantly better than a connected beam and protects against repeated service interruptions without substantial gain in service quality. As used herein a desirability margin value means the amount by which quality of in-flight connectivity service must improve before switching from one satellite beam to another available beam.

Figure 4:
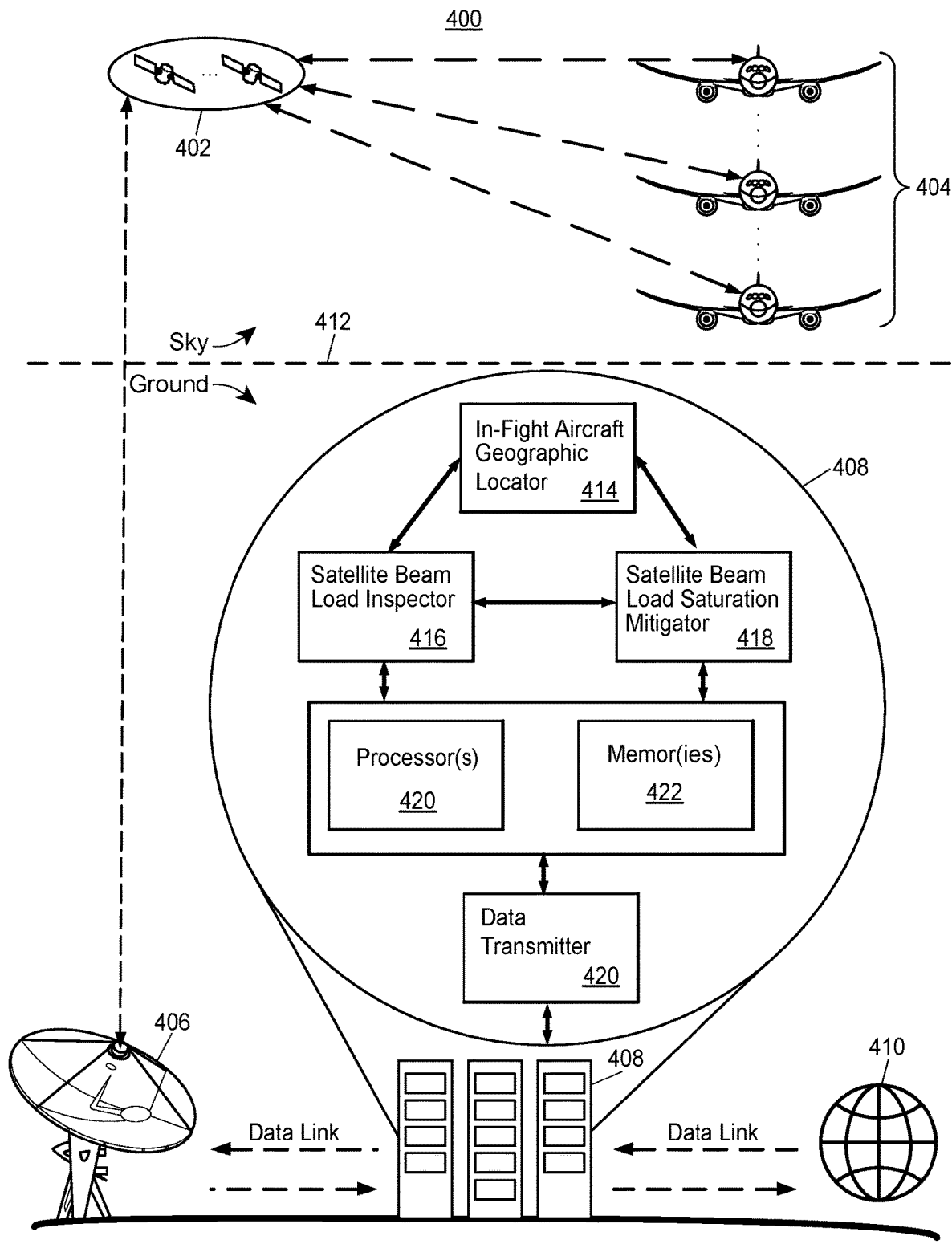
FIG. 4 is a schematic diagram of an example system for load balancing a plurality of satellite beams providing in-flight connectivity to a plurality of in-flight aircraft illustrating example components of a load balancing ground station.

The in-flight connectivity network station 108 includes several components that are described in more detail with respect to FIG. 4. One set of components is a satellite load balancer 116. The satellite load balancer 116 obtains information regarding the in-flight aircraft in the fleet of aircraft 104 including geographical position information of the in-flight aircraft and wireless data connection information regarding the in-flight aircraft in the fleet of aircraft 104. The information obtained by the satellite load balancer 116 may be collected directly or indirectly. For example, the satellite load balancer 116 may request geographical position information to be transmitted from an aircraft in the fleet of aircraft 104 directly to the in-flight connectivity network station 108. Alternatively, or additionally, the satellite load balancer 116 may obtain geographical position information from flight plans, last known position and direction of aircraft, etc. (e.g., directly or from a network management system). The satellite load balancer 116 also obtains connection information regarding the satellites 102 and the satellite beams 114. For example, the satellite load balancer 116 has access to static satellite maps 118 that are used by in-flight aircraft in the fleet of aircraft 104. The satellite load balancer 116 may infer satellite connections by individual aircraft in the fleet of aircraft 104 based on the static satellite maps and/or geographical position information obtained regarding the fleet of in-flight aircraft 104. The satellite load balancer 116 may alternatively, or additionally, obtain connection information directly from the in-flight aircraft in the fleet of aircraft 104.

Figure 2:
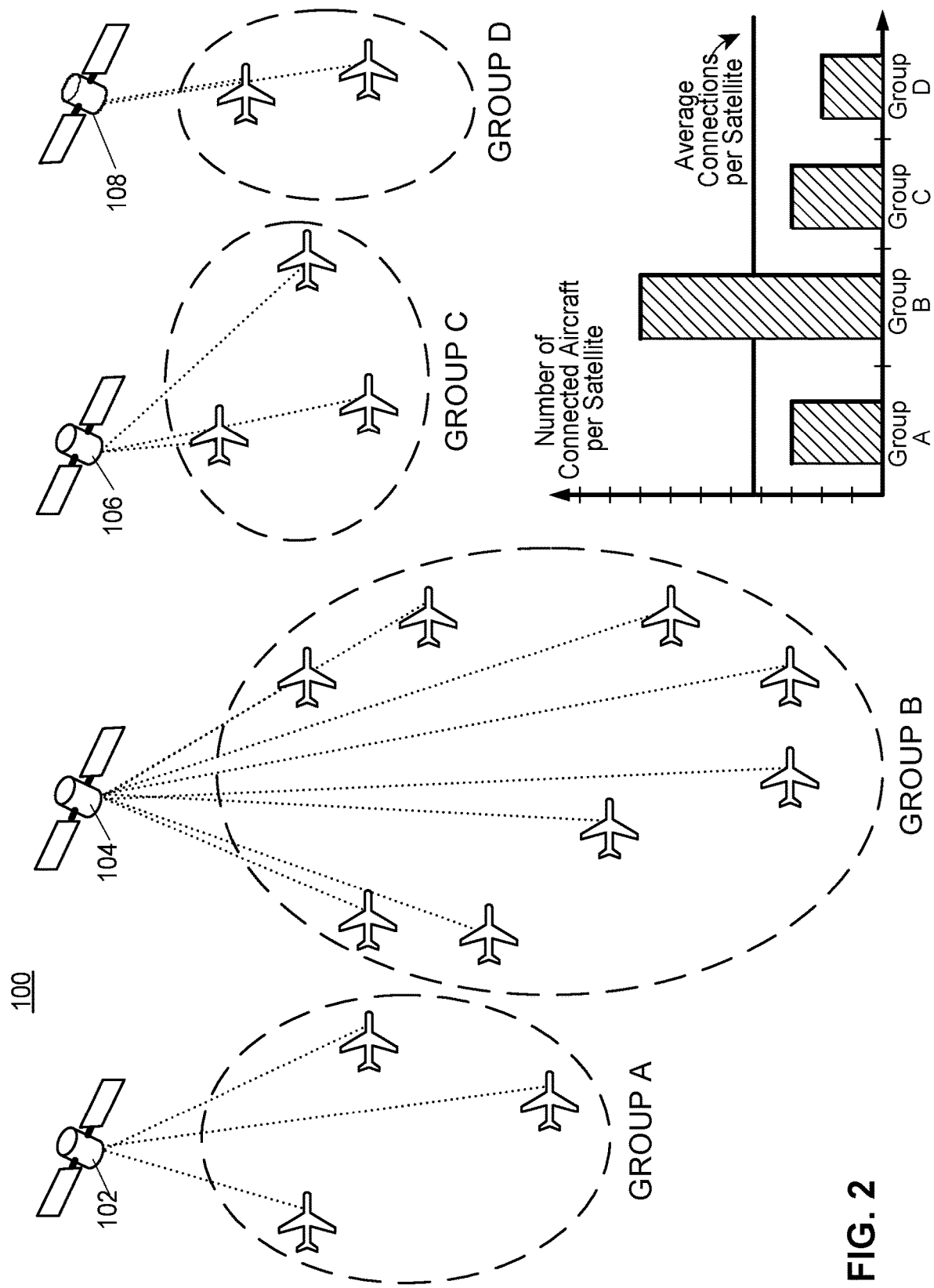
FIG. 2 is a schematic diagram of an example system for load balancing a plurality of satellite beams providing in-flight connectivity to a plurality of in-flight aircraft before a load balancing operation.

FIG. 2 is a schematic diagram of an example system 200 for load balancing a plurality of satellite beams providing in-flight connectivity to a plurality of in-flight aircraft before a load balancing operation. As illustrated in the example of FIG. 2, a plurality of in-flight aircraft are connected to a plurality of communications satellites 202, 204, 206, and 208 for the provision of in-flight connectivity service. The plurality of aircraft are grouped into fours groups: A, B, C, and D, according to which satellite the aircraft is connected. Although illustrated as separate satellites in the example of FIG. 2, the satellites 202, 204, 206, and 208 may also represent satellite beams emanating from one or more discrete orbital satellite units.

In the example of FIG. 2, the in-flight aircraft connections are not distributed evenly across the satellites 202, 204, 206, and 208. Instead, the in-flight aircraft connections are relatively more concentrated in Group B, which is connected to satellite 204. The bar graph of FIG. 2 illustrates that the number of connections in Group B deviates from the average number of connections across all example satellites 202, 204, 206, and 208. The example of FIG. 2 illustrates the distribution of satellite connections before a ground station has performed a load balancing operation.

Figure 3:
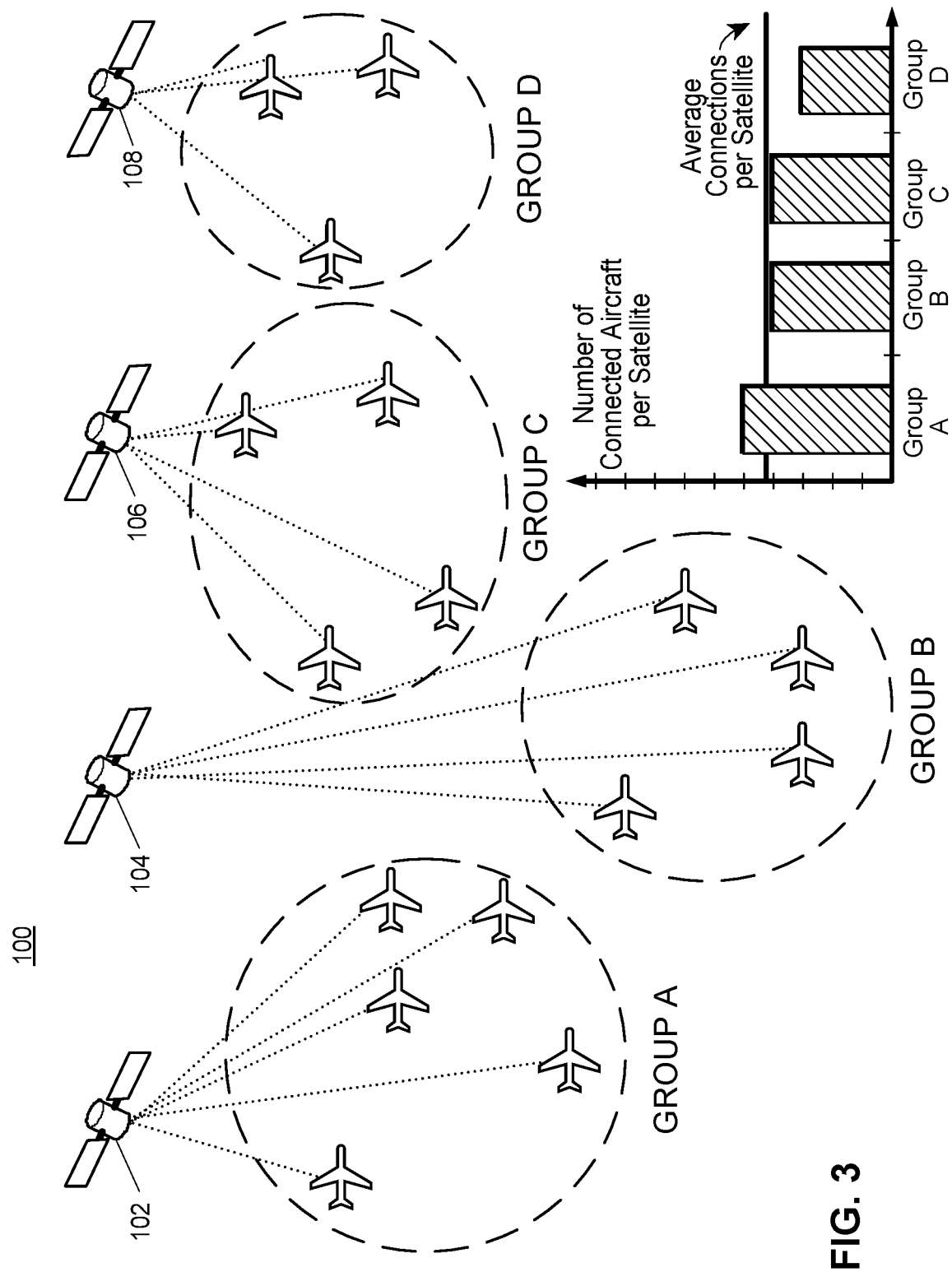
FIG. 3 is a schematic diagram of an example system for load balancing a plurality of satellite beams providing in-flight connectivity to a plurality of in-flight aircraft after a load balancing operation.

FIG. 3 is a schematic diagram 300 of an example system for load balancing a plurality of satellite beams providing in-flight connectivity to a plurality of in-flight aircraft after a load balancing operation. In the example of FIG. 3, a ground station has load balanced the connections on the satellites 302, 304, 306, and 308 by determining adjusted load balanced satellite map parameters for the satellite map programs on-board the various connected in-flight aircraft.

In an implementation, the ground station load-balances among the satellites because satellite 204 was identified as satisfying a saturation condition. Satellite 204 may have satisfied the saturation condition for a number of reasons: because the number of connections to satellite 204 exceeded a target value, because the relative number of connections to satellite 204 exceeded the average number of connections to other satellites by more than a target value, because the in-flight aircraft connected to satellite 204 experienced in-flight connectivity service levels below a target level, etc.

After the ground station adjusted and transmitted new load balanced satellite map parameters to the aircraft, the relative loads of the satellites 302, 304, 306, and 308 is more even. As shown in the bar graph of FIG. 3, each satellite of the satellites 302, 304, 306, and 308 has a number of current connections that is closer to the average among all satellites than in the example of FIG. 2.

The example of FIG. 3 illustrates the load balancing capability of an in-flight connectivity network ground station that can alter priority parameters of the satellite maps on in-flight aircraft. The in-flight connectivity network ground station, despite its physical location, has an "eye in the sky" perspective of the entire in-flight connectivity network. By dynamically updating satellite maps on individual airplanes, the in-flight connectivity network ground station counteracts the problem of individual aircraft "flying blind" with respect to the current state of the in-flight connectivity network by supplying the aircraft with updated load balanced satellite map parameters such that aircraft do not waste time attempting to connect to sub-optimal satellite beams 114 (e.g., spending time connected to satellite beams that supply lower levels of service, making connections to satellite beams 114 in a way that is unduly or unnecessarily burdensome to the in-flight connectivity network, etc.).

FIG. 4 is a schematic diagram of an example system 400 for load balancing a plurality of satellite beams providing in-flight connectivity to a plurality of in-flight aircraft illustrating example components of an in-flight connectivity network station 408. In the example illustrated in FIG. 4, the in-flight aircraft in the fleet of aircraft 404 assemble a load balanced satellite map program that is more up-to-date than a static satellite map program.

The aircraft in the fleet of in-flight aircraft control an on-board modem to connect to one of a plurality of communications satellite 402 via satellite beams to provide in-flight connectivity to the aircraft in the fleet of aircraft 404 via a wireless connection between the satellite in the group of satellites 402 and a teleport 406. The teleport 406 is communicatively connected to an in-flight connectivity network station 408, which is in turn communicatively connected to another network 410, such as the Internet or another public- or private-switched packet network or another type of network.

Once an aircraft in the fleet of aircraft 404 has established a communications connection with the ground station 408, the aircraft may receive updates to the aircraft's static satellite map program. The in-flight connectivity network station 408 may make ongoing, up-to-the-minute adjustments to load balanced satellite map parameters that it sends to the aircraft in the fleet of aircraft 404. When an aircraft in the fleet of aircraft 404 receives updated load balanced satellite map parameters from the in-flight connectivity network station 408, the aircraft updates the aircraft's local static satellite map program to include the new load balanced satellite map parameters, thus creating a load balanced satellite map program. In one implementation, the in-flight connectivity network station 408 sends only updated load balanced satellite map parameters to an aircraft 404. In another implementation, the ground station may transmit a complete new satellite map program to an aircraft in the fleet of aircraft 404 to replace a static on-board satellite map program.

In the system 400, the in-flight connectivity network station 408 has a variety of components for load balancing among the group of satellites (or satellite beams) 402. One component of the in-flight connectivity network station 408 is the in-flight aircraft geographic locator 414. In the example implementation illustrated in FIG. 4, the in-flight aircraft geographic locator 414 establishes or approximates the geographical locations of aircraft in fleets of aircraft that are configured to connect to the communication satellites 402. The in-flight geographic locator 414 establishes or approximates the geographical locations of the aircraft according to one or more of a variety of manners (e.g., self-reported aircraft location, radar aircraft location, an aircraft's flight plan and information regarding revisions thereto, triangulated location, position reported by satellite, etc.).

Once the in-flight aircraft geographic locator 414 has measured the geographic locations of the fleet of aircraft 404, the geographic location information of the fleet is available to other components in the example system 400 for load balancing a plurality of satellite beams providing in-flight connectivity to a plurality of in-flight aircraft described herein. Since any load balanced satellite map parameters or adjusted priority parameters included in a satellite map program depend at least in part on the geographic location of an aircraft connected to the in-flight connectivity network, the components of ground station 408 that calculate the load balanced satellite map parameters will need to know the geographical location of aircraft in the fleet of aircraft 404 to calculate the effects of changes to satellite map parameters on the network load and to load-balance across all available satellites 402.

The in-flight aircraft geographic locator 414 may also collect other information regarding the aircraft in the fleet of aircraft 404 that has a bearing on the future geographic position of the aircraft. Aircraft direction and speed may be collected to estimate an aircraft's future position. Direction and speed information may be collected directly from an aircraft in the fleet of aircraft 404 or it may be collected by indirect means (e.g., access to an aircraft's flight plan, instructions from an air-traffic controller to the aircraft, information regarding weather, local traffic, temporary and/or permanent flight restricted areas, an aircraft's final destination, etc.). Information collected by the in-flight aircraft geographic locator 414 that has an indirect bearing on the future geographical position of an aircraft in the fleet of aircraft 404 may be collected from a carrier operating an aircraft, from a government authority, etc.

Another component of the in-flight connectivity network station 408 is the satellite beam load inspector 416. The satellite beam load inspector 416 is communicatively connected to one or more of the satellites 402 via a teleport 406. The satellite beam load inspector 416 monitors the satellites in the group of satellites 402 to collect load information. Load information from the satellites in the group of satellites 402 may be collected in a variety of ways. The satellite beam load inspector 416 may query the satellites in the group of satellites 402 directly via the data link with the teleport 406, which is connected communicatively to the satellites 402. The data link with the teleport 406 may be a variety of different types of data links. In one implementation, the data link is a telco-data link that includes lines leased by the operator of the in-flight connectivity network station 408. In another implementation, the data link includes private lines (e.g., optical) that are owned by the operator of the in-flight connectivity network station 408.

In at least one implementation, the satellite beam load inspector 416 collects information indirectly about the load on each of the satellites in the group of satellites 402 by collecting information from the aircraft in the fleet of aircraft 404 that are connected to respective satellites. The aircraft in the fleet of aircraft 404 are themselves in communication with the in-flight connectivity network station 408 and can report on characteristics of the in-flight connectivity service the aircraft receive from the satellites 402 to the satellite beam load inspector 416. One type of information that the aircraft in the fleet of aircraft 404 can report to the satellite beam load inspector 416 are the data rates for uplink and downlink with the satellite 402 that the aircraft has experienced while connected to the satellite 402. The aircraft in the fleet of aircraft 404 can also report information to the satellite beam load inspector 416 to indicate to the satellite beam load inspector 416 loads on respective satellites in the group of satellites 402 (e.g., when the aircraft was connected to a satellite, how long the aircraft was connected to the satellite, how much total data was exchanged between the aircraft and the satellite, how much data was customer data and how much data was system data, etc.).

Once the satellite beam load inspector 416 has measured the respective load level information of the satellites in the group of satellites 402, the load level information of the group of satellites is available to other components in the example system 400 for load balancing a plurality of satellite beams providing in-flight connectivity to a plurality of in-flight aircraft described herein. Since any mitigation of saturation conditions experienced by the satellites in the group of satellites 402 depends on detecting the saturation conditions and knowledge of where free satellite beam capacity exists, any load balanced satellite map parameters or adjusted priority parameters included in a load balanced satellite map program depend at least in part on the load levels of the satellites connected to the in-flight connectivity network, the components of ground station 408 that calculate the load balanced satellite map parameters will need to know the respective load level information of the satellites in the group of satellites 402 to calculate the effects of changes to load balanced satellite map parameters on the network load and to load-balance across all available satellites 402.

Another component of the ground station 408 is the satellite beam load saturation mitigator 418. The satellite beam load saturation mitigator 418 evaluates whether the load level information supplied by the satellite beam load inspector satisfies a saturation condition for any of the satellites in the group of satellites 402. If any such saturation condition is satisfied, the satellite beam load saturation mitigator 418 determines adjusted load balanced satellite map parameters for one or more aircraft in the plurality of aircraft 404. The new or adjusted load balanced satellite map parameters are determined by the satellite beam load saturation mitigator 418 based on several types of information and rules (information regarding the geographic locations of the aircraft in the fleet of aircraft 404, load level information of the satellites in the group of satellites 402, direction and speed of the aircraft in the fleet of aircraft 404, etc.).

The satellite beam load saturation mitigator 418 determines a projected balanced load level among the satellites in the group of satellites 402 further according to a set of rules for distribution of communications load over the satellites 402. Factors bearing on the rules used by the satellite beam load saturation mitigator 418 include relative satellite beam strength in the center of a satellite beam compared to at the edge of the satellite beam. Since aircraft are likely to encounter a weaker signal when the aircraft is located geographically at the edge of a satellite beam, the aircraft is likely to experience a longer handshake and period of time to open the communications session than if the aircraft were located closer to the geographic center of the satellite beam. Since a longer period of time to open a communications session is more likely to expose users to a gap in service and likely lower quality service, the satellite beam load saturation mitigator 418 may avoid adjusted load balanced satellite map parameters that are likely to cause an aircraft in the fleet of aircraft 404 to choose to connect to a satellite beam when the aircraft is near the geographic edge of the beam.

In at least one implementation, the satellite beam load saturation mitigator 418 determines a series of adjustments to satellite map parameters to send to one or more of the aircraft in the fleet of aircraft 404 over a period of time. Transmitting a series of adjustments to the satellite map parameters may cause certain aircraft in the fleet of aircraft 404 to switch to another satellite beam when the aircraft receive ones of the set of updates. By shifting the satellite beams to which an aircraft is connect while the aircraft is in a geographic zone that is served by more than one suitable satellite beam allows the satellite beam load saturation mitigator 418 to move other aircraft in the fleet of aircraft 404 to the satellite beam from which others of the aircraft have switched away. Efficient load balancing solutions change as various the satellite beams become more desirable to aircraft as the aircraft move along their routes over time. Transmitting sets of adjusted satellite map parameters over time as allows the satellite beam load saturation mitigator 418 to continually supply efficient satellite map parameters to the fleet 404 as load conditions change.

The satellite beam load saturation mitigator 418 may rely on heuristics to refine adjustments to satellite map parameters to send to aircraft in the fleet of aircraft 404. Aircraft in the fleet of aircraft 404 may communicate quality of service data back to the ground station 408 for logging and analysis to improve future satellite map parameter decisions. In an implementation, quality of service data includes whether an aircraft in the fleet of aircraft 404 encountered difficulty in connecting to one of the satellites 402. With this information, operations staff may investigate and potentially take action to minimize the impact to other aircraft in the fleet of aircraft 404. Operations staff may be able to make configuration changes to one of the satellites 402 to remedy connection difficulties. Heuristics data may also provide information regarding the satellite beam topology that can be used by the satellite beam load saturation mitigator 418 to adjust satellite map parameters. Characteristics of the beam topology can be taken into account by the satellite beam load saturation mitigator 418 to find ever more favorable load balancing among the aircraft in the fleet of aircraft seeking in-flight connectivity service from the satellites 402.

In the example illustrated in FIG. 4 the in-flight connectivity network station 408 includes processor(s) 420 and memor(ies) 422. Processor(s) 420 and memor(ies) 422 may store instructions and carry out any of the operations of the ground station 408 as described herein. For example, memor(ies) 422 may store instructions implementing the functions of the in-flight geographic locator 414, the satellite beam load inspector 416, the satellite beam load saturation mitigator 418, the data transmitter 412, etc. that are executable by the processor(s) 420. The memor(ies) 422 may also store information collected by the aforementioned components of the ground station 408 including information relating to the group of satellites 402 and the fleet of aircraft 404.

Another component of the in-flight connectivity network station 408 is the data transmitter 412. The data transmitter 412 is connected communicatively to the satellites 402 via the teleport 406, and thus is connected communicatively to the aircraft in the fleet of aircraft 404 that have open connections with one of satellites 402. The data transmitter 412 is configured to send information to aircraft in the fleet of aircraft 404 including updated, load balanced satellite map parameters for the aircraft to assemble into a load balanced satellite map program. The data transmitter 412 is further configured to receive information from aircraft in the fleet of aircraft 404 including information regarding the state of the aircraft (geographic position, direction and speed, information regarding a connection with one of the satellites 402, etc.). The data transmitter 412 is further configured to exchange information via a Telco-data link with another network 410, such as a private or public packet-switched network such as the Internet. Information exchanged with the other network 410 may include information relating to the state of the aircraft in the fleet of aircraft 404 such as information supplied by an aircraft operator, a government authority, etc. Information exchanged with the other network 410 may also include customer or user data received from and/or sent to users of the in-flight connectivity network on aircraft in the fleet of aircraft 404.

Figure 5:
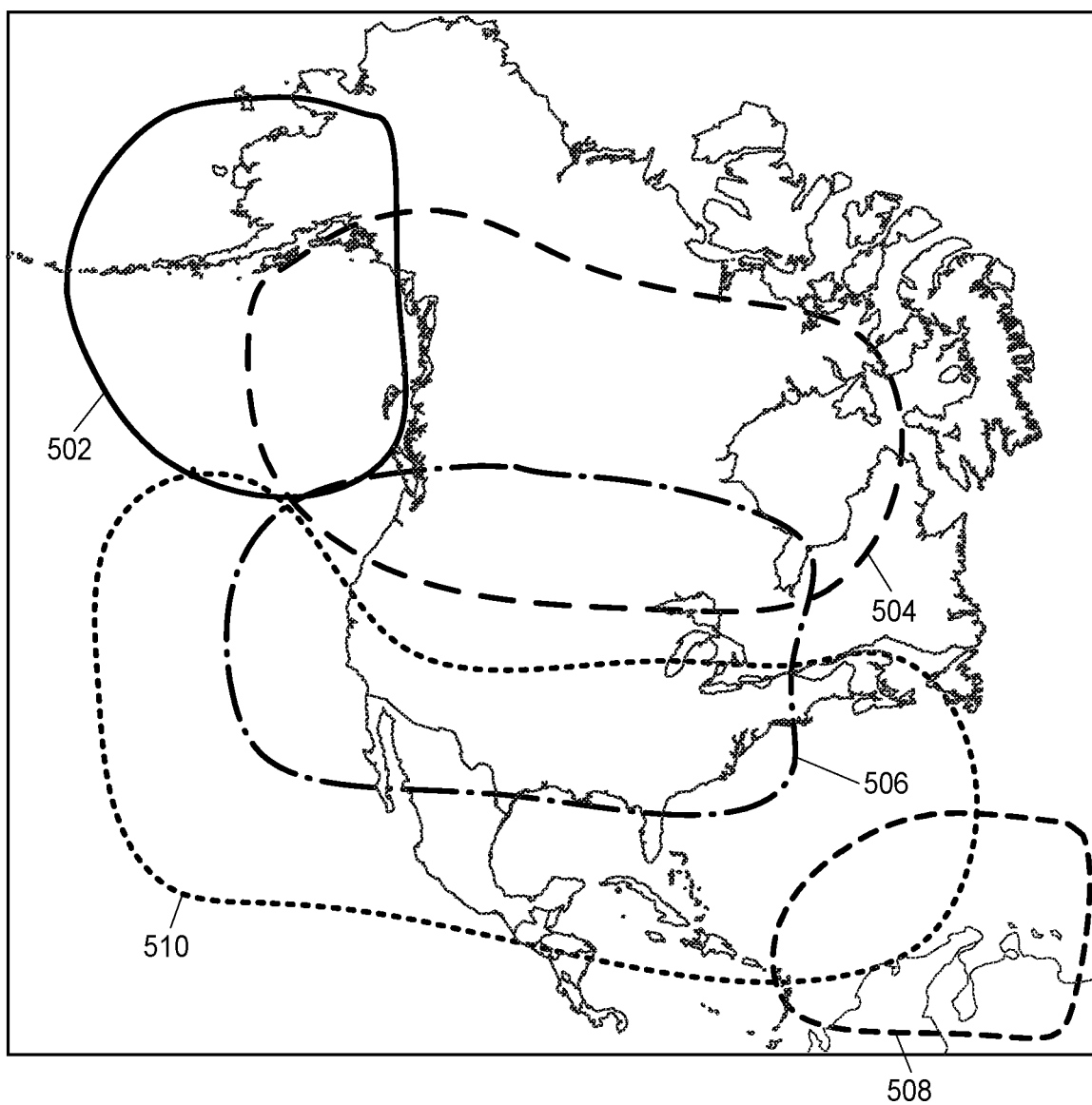
FIG. 5 is an example satellite beam coverage map illustrating satellite beam coverage areas in an example system for load balancing a plurality of satellite beams providing in-flight connectivity in North America.

FIG. 5 is an example satellite beam coverage map 500 illustrating satellite beam coverage areas 502, 504, 506, 508, and 510 in an example system for load balancing a plurality of satellite beams providing in-flight connectivity in North America. Each of the satellite beam coverage areas 502, 504, 506, 508, and 510 represent an example geographic area for which the satellite beam could provide in-flight connectivity to an in-flight aircraft. The satellite beam coverage map 500 illustrates that some satellite beam coverage zones overlap, such as a bottom portion of satellite coverage zone 504 and an upper portion of satellite coverage zone 506. Overlapping regions such as these provide opportunities for a load balancing system to transmit updated load balanced satellite map parameters to aircraft currently in the overlapping region to instruct the aircraft to re-prioritize beams and switch from one beam to another to balance the communications load across the satellites.

Figure 6:
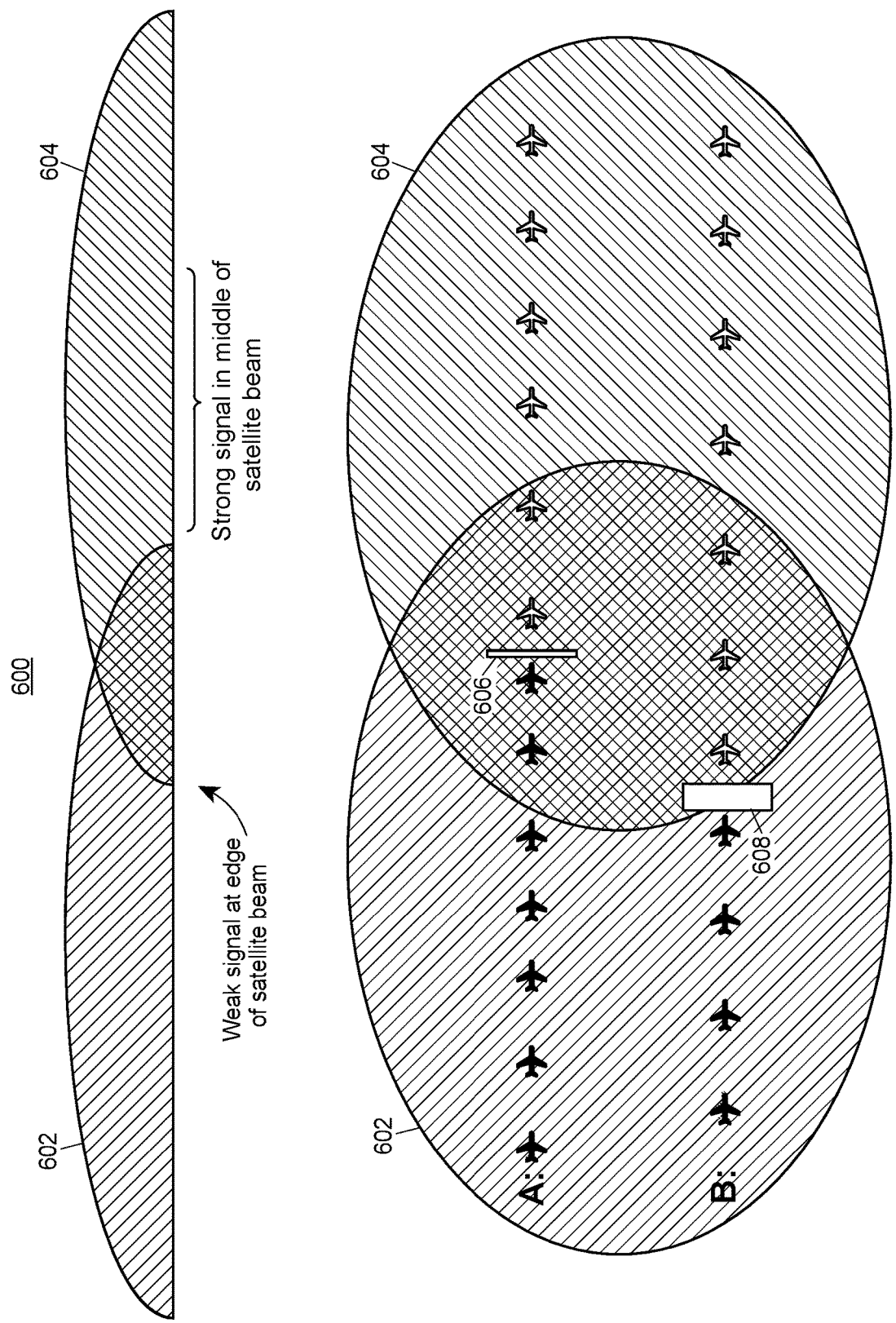
FIG. 6 is a schematic diagram illustrating satellite beam signal strength in relation to beam geometry in an example system for load balancing a plurality of satellite beams providing in-flight connectivity.

FIG. 6 is a schematic diagram 600 illustrating satellite beam signal strength in relation to beam geometry in an example system for load balancing a plurality of satellite beams providing in-flight connectivity. Two overlapping satellite beam coverage areas 602 and 604 are shown in side-view and above-view. As illustrated in FIG. 6, a satellite signal is weaker near the edge of the satellite beam coverage zone 604 compared to the center of the zone. Flight progressions A and B illustrate two example flight paths from satellite beam coverage area 602 into satellite beam coverage area 604 over time. Flight progression A attempts a communications switch from the satellite beam represented by satellite beam coverage zone 602 to the satellite beam represented by satellite beam coverage zone 604 at a location 606. Since location 606 is nearer to the center of satellite coverage zone 604, the transition occurs more quickly. Flight progression B, on the other hand, attempts a communications switch from the satellite beam represented by satellite beam coverage zone 602 to the satellite beam represented by satellite beam coverage zone 604 earlier at a location 608. Since location 608 is nearer to the edge of satellite coverage zone 604, the transition occurs more slowly because it typically takes more time to lock onto a weaker signal. Therefore, there is an optimal point to switch beams. Relative proximity to the center of a satellite beam coverage zone is therefore a factor relied upon to adjust load balanced satellite map parameters for load balanced satellite map programs.

Figure 7:
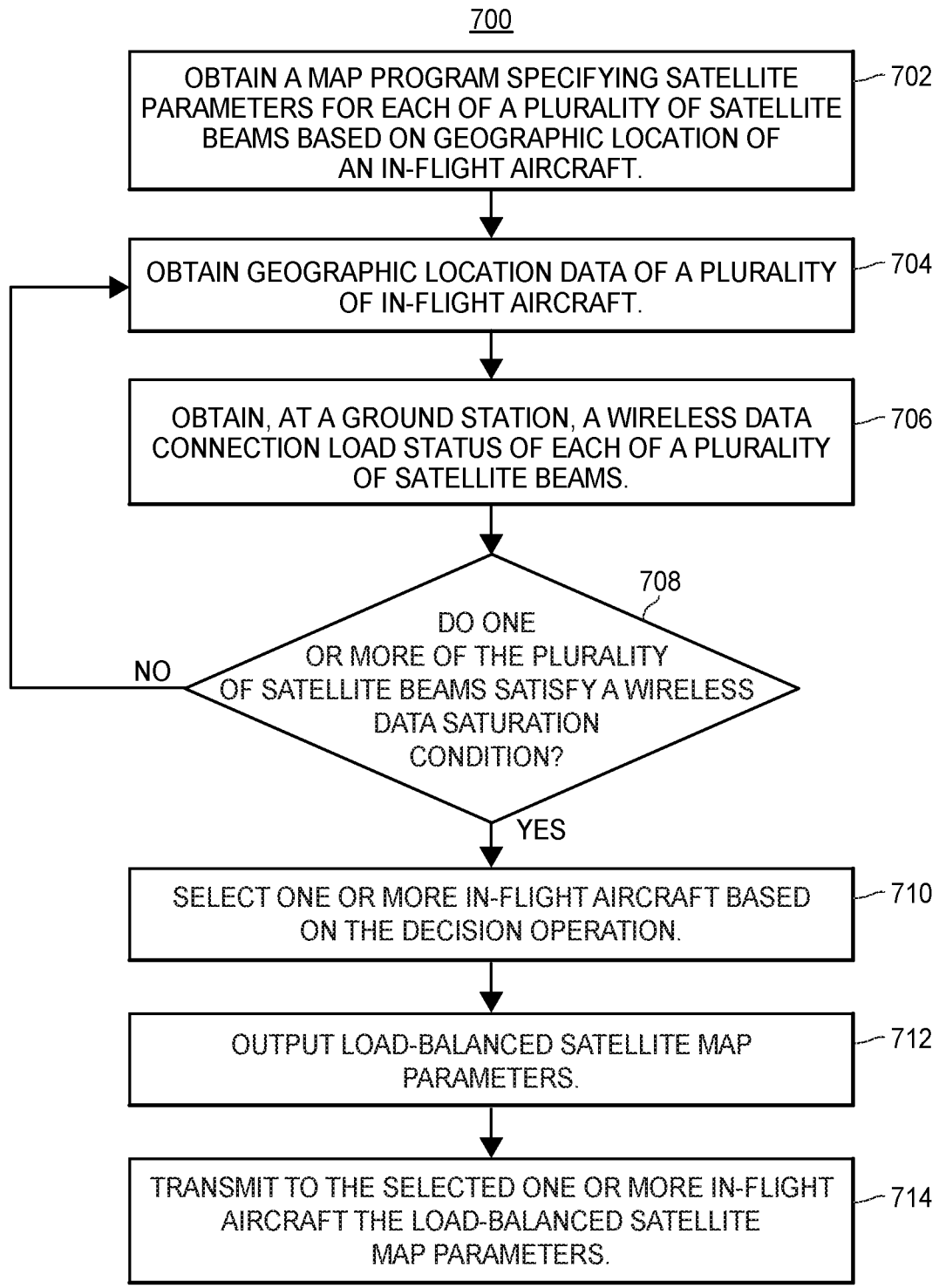
FIG. 7 illustrates example operations for load balancing satellite data connections among a group of in-flight aircraft in an example system for load balancing a plurality of satellite beams providing in-flight connectivity.

FIG. 7 illustrates example operations 700 for load balancing satellite data connections among a group of in-flight aircraft in an example system for load balancing a plurality of satellite beams providing in-flight connectivity. An obtaining operation 702 obtains a satellite map program specifying satellite map parameters for each of a plurality of satellite beams based on geographic location of an in-flight aircraft. The satellite map program may be viewed as a geolocation lookup table that shows which satellite beams cover which locations and the desirability of each beam as a function of geographic position. In an embodiment, the satellite map program obtained in operation 702 is the same as a static satellite map on-board an in-flight aircraft that may connect to a satellite-based in-flight connectivity service.

A measuring operation 704 measures geographic location data of a plurality of in-flight aircraft out of a fleet of aircraft 404 that are capable of connecting to an in-flight connectivity system. Measuring operation may establish or approximate the geographical locations of aircraft in fleets of aircraft 404 that are configured to connect to communications satellites. The measuring operation 704 may rely on information including self-reported aircraft location, radar aircraft location, an aircraft's flight plan and information regarding revisions thereto, triangulated location, position reported by satellite, etc. to perform operation 704.

Measuring operation 704 may also collect other information regarding an in-flight aircraft that has a bearing on the aircraft's future geographic position. Measuring operation 704 may sense direction and speed information may be collected directly from an aircraft or indirectly (e.g., access to an aircraft's flight plan, instructions from an air-traffic controller to the aircraft, information regarding weather, local traffic, temporary and/or permanent flight restricted areas, an aircraft's final destination, etc.).

A monitoring operation 706 monitors, at a ground station, a wireless data connection load status of each of a plurality of satellite beams. The wireless data connection load status may be collected by monitoring operation 706 in a variety of ways. Monitoring operation 706 may query the satellites in the group of satellites directly via a Telco-data link with a teleport 406. In at least one implementation, monitoring operation 706 collects information indirectly about the load on each of the satellites in the group of satellites 402 by collecting information from an aircraft that is connected to a respective satellite. The aircraft in the fleet of aircraft 404 are themselves in communication with the ground station 408 and can report on characteristics of the in-flight connectivity service the aircraft receive from the satellites as part of the monitoring operation 706 (e.g., through a global network management system which controls the teleports and/or hubs). One type of information that monitoring operation 706 can collect via in-flight aircraft are the data rates for uplink and downlink with a satellite that the aircraft has experienced while connected to the satellite. Monitoring operation 706 can also collect other information from in-flight aircraft that indicates loads on respective satellites in the group of satellites (e.g., when the aircraft was connected to a satellite, how long the aircraft was connected to the satellite, how much total data was exchanged between the aircraft and the satellite, how much data was customer data and how much data was system data, etc.).

A decision operation 708 determines whether one or more of the plurality of satellite beams satisfy a wireless data connection saturation condition. In an implementation, a wireless data connection saturation condition may be satisfied by a satellite and/or satellite beam if the number of connected in-flight aircraft is above a target value. The target value need not be the maximum number of connections that the communications satellite is capable of, nor need the target value include enough connections such that connected in-flight aircraft experience service degradation. Instead, the target value may be a value determined in advance that is expected to support an overall load balancing on the network. In at least one embodiment, the target value is derived from an average number of connections that are desired on the network, such as being within a percentage of the average number of in-flight connections across the network or anticipating aircraft about to enter an alternate beam.

In other implementations, a target number of in-flight connections, above which a wireless data saturation condition is satisfied, are based on performance data. If the data bandwidth requested by the in-flight aircraft connected to a satellite exceeds a limit value, the target number of connections may be reduced. In another implementation, if the amount of time that in-flight aircraft take to successfully establish a connection with a satellite exceeds a limit value, then the target number of in-flight connections may be reduced. The target number of in-flight connections may further be based on heuristic analysis of a connection history of a satellite. If historical data reveals that a particular satellite or satellite beam performs poorly when supporting over a certain number of connections or when connected in-flight aircraft are behaving in a certain way (e.g., requesting large amounts of upstream or downstream data; opening an excessive number of end-user connections; etc.), then the target number of connections needed to satisfy the wireless data connection saturation condition may be lowered.

A selecting operation 710 selects one or more in-flight aircraft based on the decision operation 710. In an implementation, the selecting operation 710 selects in-flight aircraft that are connected to a satellite that satisfies a wireless data connection saturation condition. In another implementation, the selecting operation 710 selects aircraft that are expected to enter into a satellite beam coverage zone that satisfies a wireless data connection saturation condition. If the selecting operation 710 selects in-flight aircraft based on an expected future connection to a satellite beam that satisfies a saturation condition, the selecting operation 710 may be based on data obtained by other of the operations 700, including without limitation measuring operation 704 and obtaining operation 702 regarding the geographic position, speed and direction, flight plan data, etc. of in-flight aircraft.

In another implementation, the selecting operation 710 selects aircraft that are currently located in a geographic region where more than one satellite beam coverage zone overlaps with another satellite beam coverage zone. If an in-flight aircraft is located in a region where one satellite beam coverage zone overlaps with another satellite beam coverage zone, then that aircraft is a candidate to be moved from the connected satellite beam to the one or more other satellite beams that serve the geographic location that the in-flight aircraft is currently in. The selecting operation 710 may want to select such an in-flight aircraft if the satellite beam that the aircraft is currently connected to satisfies a wireless data connection saturation condition or is expected to satisfy a wireless data saturation condition in the future. If the selecting operation 710 relies on determination that a connected satellite beam is expected to satisfy a wireless data connection saturation condition in the future, this determination may be based on data collected by other of the operations 700, for example without limitation measuring operation 704 and obtaining operation 702.

An outputting operation 712 outputs load balanced satellite map parameters. In an implementation, the load balanced satellite map parameters are only the values needed by an in-flight aircraft to assemble a new load balanced onboard satellite map program. In other words, the load balanced satellite map parameters do not include a complete satellite map program, or even omits many parts of a complete satellite map program, because in-flight aircraft need not refresh all information in the satellite map program (e.g., satellite beam connection information, beam status, connection intensity information, etc.) for each beam, but instead need only to update the parameters that the in-flight aircraft uses to determine the priority of a particular satellite beam based on the in-flight aircraft's geographical location. In another implementation, the outputting operation 712 outputs a complete satellite map program including load balanced satellite map parameters.

In an implementation, the outputting operation 712 outputs load balanced satellite map parameters designed to mitigate one or more wireless data connection saturation conditions on satellites in the in-flight connectivity network. In other implementations, the outputting operation 712 outputs load balanced satellite map parameters designed to avoid an expected wireless data connection saturation condition at a future time. Other load balancing or quality of service factors may be taken into account in outputting operation 712 including weather, local traffic, temporary or permanent flight restricted areas, scheduled or unscheduled down-time for certain satellite beams, jet stream perturbations, atmospheric interferences, political or other disruptions to scheduled air travel routes, etc. If the decision operation 708 selects in-flight aircraft that are not yet connected to a satellite beam that satisfies a wireless data connection saturation condition, then there will be a hysteresis period until the saturation condition is no longer satisfied because the satellite map parameters output by outputting operation 712 will take a period of time until their effect is seen on the in-flight connectivity network.

A transmitting operation 714 transmits to the one or more in-flight aircraft the load balanced satellite map parameters. In an implementation, the transmitting operation transmits the load balanced satellite map parameters to the in-flight aircraft selected by the selecting operation 710. In another implementation, the transmitting operation 714 transmits to the one or more in-flight aircraft the load balanced satellite map parameters via a Teleport to the in-flight aircraft via an existing wireless data connection with a satellite beam. In yet another implementation, the transmitting operation 714 transmits to the one or more in-flight aircraft the load balanced satellite map parameters via another type of data connection such as an ATG (air-to-ground) data connection, terrestrial cellular modem, and/or via a physical data transfer (e.g., if the aircraft onboards the load balanced satellite map parameters when on the ground such as from a wired data connection, via transfer on physical storage media, etc.).

Figure 8:
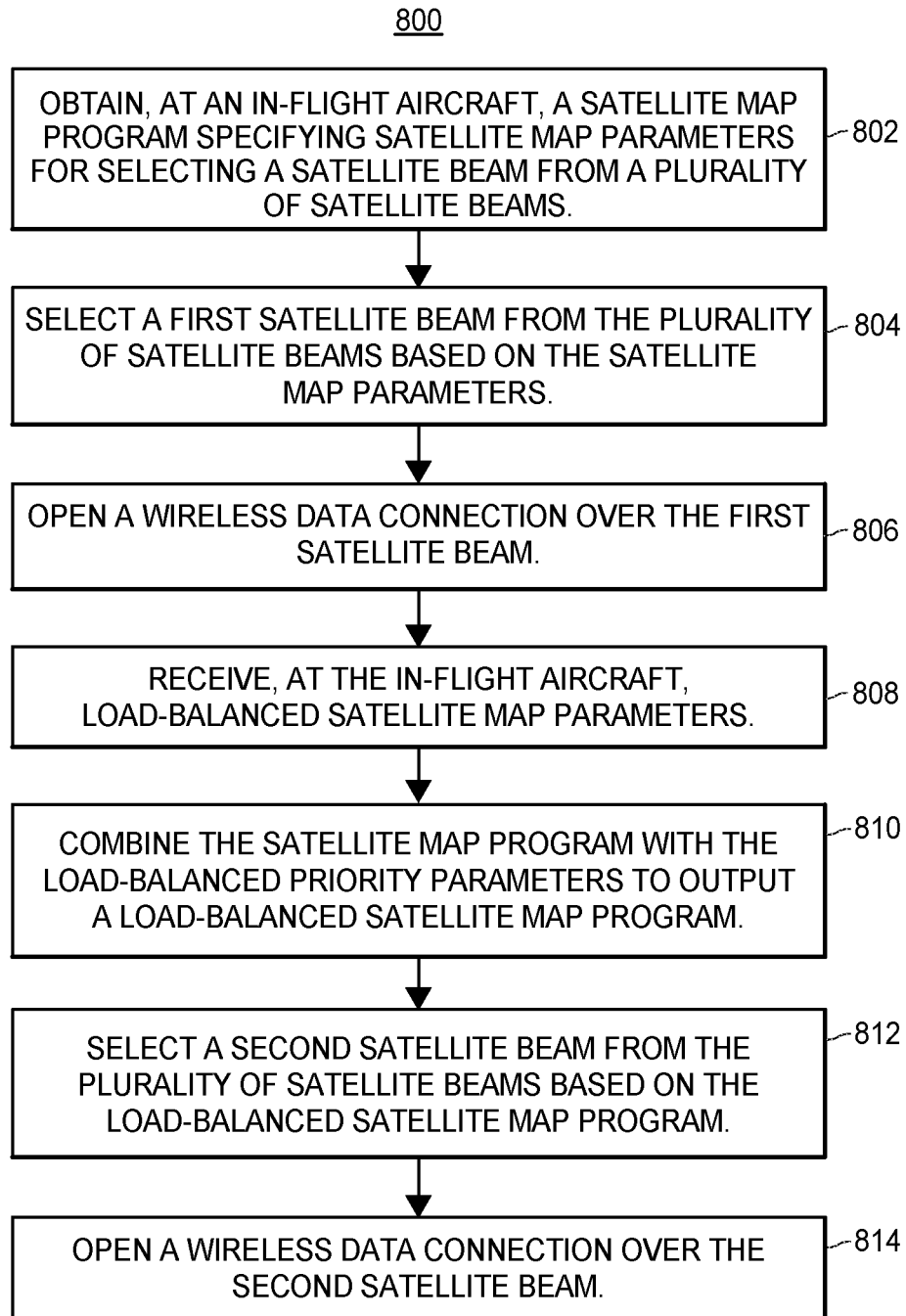
FIG. 8 illustrates example operations for selecting a satellite beam in an example system for load balancing a plurality of satellite beams providing in-flight connectivity.

FIG. 8 illustrates example operations 800 for selecting a satellite beam in an example system for load balancing a plurality of satellite beams providing in-flight connectivity. An obtaining operation 802 obtains, at an in-flight aircraft, a satellite map program specifying satellite map parameters for selecting a satellite beam from a plurality of satellite beams. The obtaining operation may utilize an existing wireless data connection with a satellite beam. In yet another implementation, the obtaining operation 802 obtains the satellite map program via another type of data connection such as an ATG (air-to-ground) data connection, terrestrial cellular modem, and/or via a physical data transfer (e.g., if the aircraft onboards the load balanced satellite map parameters when on the ground such as from a wired data connection, via transfer on physical storage media, etc.).

The satellite map program obtained by the obtaining operation 802 may include other information relating to the selection of and connection to a satellite beam by an in-flight aircraft (e.g., satellite beam connection information, beam status, connection intensity information, etc.). The satellite map program obtained by the obtaining operation 802 may further include one or more timestamps defining a time period during which certain satellite map parameters are valid. After the expiration of the time period defined by the timestamps, other satellite map parameters may be substituted for the expired satellite map parameters. The timestamp information may be included due to other factors known to affect scheduled air travel (including weather, local traffic, temporary or permanent flight restricted areas, scheduled or unscheduled down-time for certain satellite beams, jet stream perturbations, atmospheric interferences, political or other disruptions to scheduled air travel routes, etc.).

A selecting operation 804 selects a first satellite beam from the plurality of satellite beams based on the satellite map parameters. The selecting operation 804 may apply satellite map parameters to apply a weight to the relative desirability of satellite beams available in the geographic region in which an in-flight aircraft is located. The satellite map parameters may be thought of as a function with the in-flight aircraft's geographic location as an independent variable that causes the satellite map parameters to change as the in-flight aircraft's geographic position changes. The satellite map parameters may alternatively, or additionally, be thought of as a function with the in-flight aircraft's speed and direction as other independent variables that cause the satellite map parameters to change as the in-flight aircraft's expected future geographic position changes.

In an implementation the selecting operation 804 selects the first satellite beam by means other than a modem on an in-flight aircraft. Instead, the selecting operation 804 may be performed by a Mobility Control Program (MCP) executing on an in-flight aircraft or another non-modem piece of communications equipment disposed on the in-flight aircraft. The in-flight aircraft therefore need not rely on a modem to itself select from available satellites according to the rules embodied on the modem itself. The satellite beam load balancing system described herein takes satellite beam selection over from the logic embodied in a modem. The MCP is a higher-level program than the modem in that the MCP is aware of all the satellite beams contained in a map file, and can be optimized with current position information, and has the advantage of being able to be updated with up-to-date network information from the ground controller to make more optimized satellite beam selection choices than what would be available with static map files alone.

An opening operation 806 opens a wireless data connection over the first satellite beam. In an implementation, the opening operation 806 is performed by a modem on-board the in-flight aircraft and supplies in-flight connectivity to end-users on board the in-flight aircraft and to other systems on the in-flight aircraft that require in-flight connectivity services.

A receiving operation 808 receives, at the in-flight aircraft, via the first satellite beam, load balanced satellite map parameters that are different from the satellite map parameters included in the in-flight aircraft's satellite map program. In an implementation, the receiving operation 808 may utilize an existing wireless data connection with a satellite beam. In an alternative implementation, the receiving operation 808 receives the load balanced satellite map parameters via another type of data connection such as an ATG (air-to-ground) data connection, a terrestrial cellular modem, and/or via a physical data transfer (e.g., if the aircraft onboards the load balanced satellite map parameters when on the ground such as from a wired data connection, via transfer on physical storage media, etc.).

A combining operation 810 combines the satellite map program obtained in obtaining step 802 with the load balanced satellite map parameters received in receiving step 808 to output a load balanced satellite map program. In an implementation where the load balanced satellite map parameters comprise a complete satellite map program, the combining operation 810 discards any previous satellite map program and replaces it with the complete satellite map program received in receiving step 808. The combining operation 810 may output a temporary satellite map program if the load balanced satellite map parameters include expiration timestamps.

A selecting operation 812 selects a second satellite beam from the plurality of satellite beams based on the load balanced satellite map program. The selecting operation may take the in-flight aircraft's current geographical position and/or an expected future geographical position in selecting the second satellite beam. An opening operation 814 opens a wireless data connection over the second satellite beam according to the same principles as opening operation 806.

Figure 9:
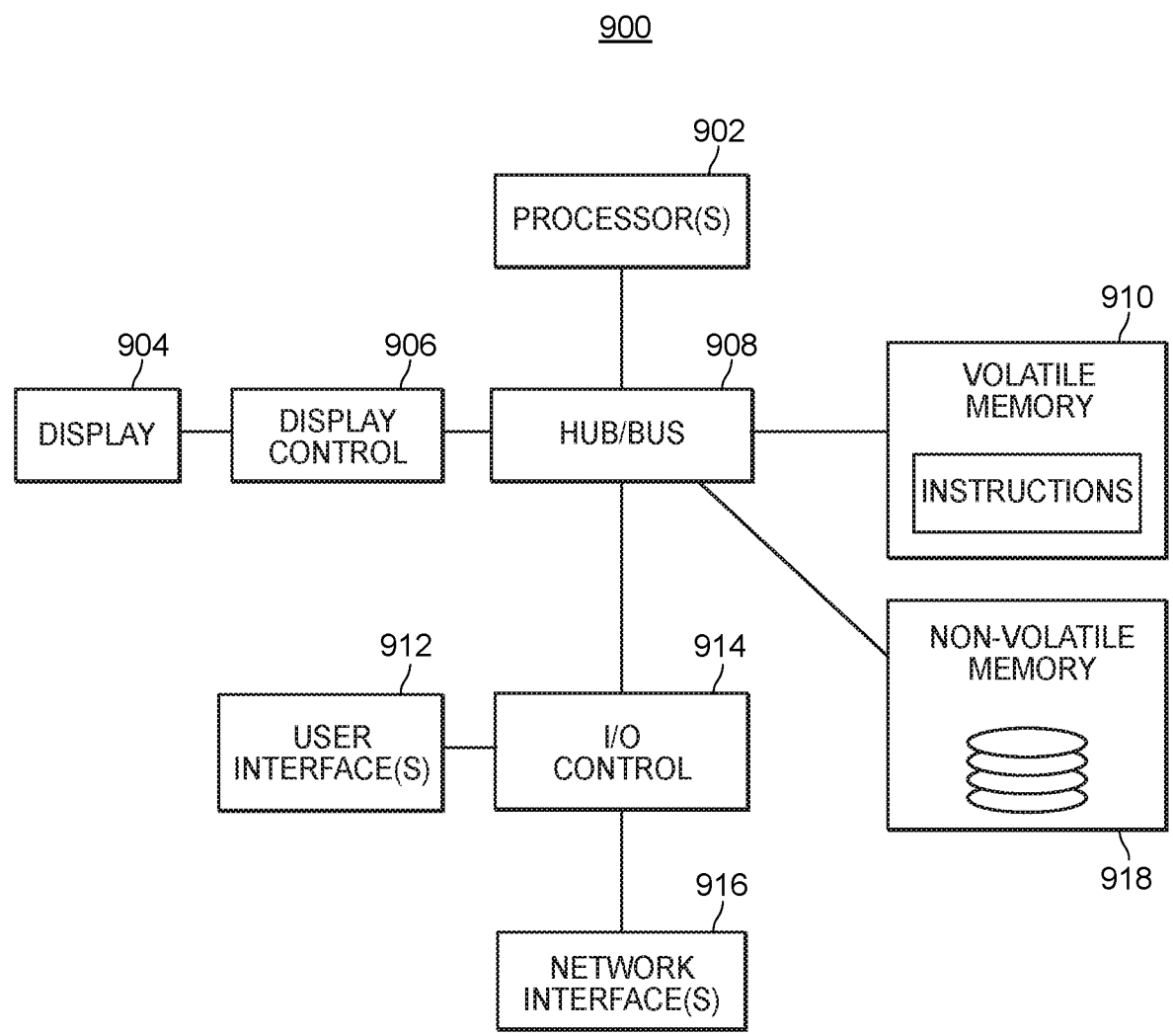
FIG. 9 illustrates an example system that may be useful in carrying out the implementations of a system for load balancing a plurality of satellite beams providing in-flight connectivity described herein.

FIG. 9 illustrates an example system 900 that may be useful in carrying out the implementations of a system for load balancing a plurality of satellite beams providing in-flight connectivity described herein. For example, one or more computing devices 900 may be particularly configured to be utilized as at least a portion of a ground station 408, a teleport 406, for on-board services on an in-flight aircraft, the satellites 402, and other components disclosed herein.

The computing device 900 may include, for example, one more central processing units (CPUs) or processors 902, and one or more busses or hubs 908 that connect the processor(s) 902 to other elements of the computing device, such as a volatile memory 910, a non-volatile memory 918, a display controller 906, and an I/O controller 914. The volatile memory 910 and the non-volatile memory 918 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 910 and/or the memory 918 may store instructions that are executable by the processor 902. For example, in a computing device particularly configured to be included in the ground station 408, the instructions may be the instructions comprising the satellite beam load balancing components described herein, for example with respect to FIG. 4. In another example, in a computing device 900 particularly configured to be on-board the in-flight aircraft, the instructions may be the instructions disclosed as performing the operations of the method 800. Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 910, 918 stores a subset of the modules and data structures identified herein. In other embodiments, at least one of the memories 910, 918 stores additional modules and data structures not described herein.

In an embodiment, the display controller 906 may communicate with the processor(s) 902 to cause information to be presented on a connected display device 904. In an embodiment, the I/O controller 914 may communicate with the processor(s) 902 to transfer information and commands to/from the user interface 912, which may include a mouse, a keyboard or key pad, a touch pad, click wheel, lights, a speaker, a microphone, etc. In an embodiment, at least portions of the display device 904 and of the user interface 912 are combined in a single, integral device, e.g., a touch screen. Additionally, data or information may be transferred to and from the computing device 900 via a network interface 916. In some embodiments, the computing device 900 may include more than one network interface 916, such as a wireless interface and a wired interface.

The illustrated computing device 900 is only one example of a computing device suitable to be particularly configured for use in the satellite beam load balancing system described herein. Other embodiments of the computing device 900 may be also be for use in satellite beam load balancing system described herein, even if the other embodiments have more or fewer components than shown in FIG. 9, have one or more combined components, or have a different configuration or arrangement of the components. Moreover, the various components shown in FIG. 9 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

A method of load balancing satellite data connections among a group of in-flight aircraft, the method comprising: obtaining geographic position data of a plurality of in-flight aircraft; obtaining, at an in-flight connectivity network ground station, a wireless data connection load status of each of a plurality of satellite beams configured to provide wireless data connections, each of the plurality of in-flight aircraft being configured to connect a modem to a selected satellite beam of the plurality of satellite beams according to satellite map parameters in an on-board satellite map program; determining whether one or more of the plurality of satellite beams satisfies a wireless data connection saturation condition; selecting one or more in-flight aircraft of the plurality of in-flight aircraft based on the determining operation; outputting load balanced satellite map parameters, the load balanced satellite map parameters being different from the map parameters of the on-board satellite map program of the selected one or more in-flight aircraft of the plurality of in-flight aircraft; and transmitting, by the in-flight connectivity network ground station, to the selected one or more in-flight aircraft of the plurality of in-flight aircraft the load balanced satellite map parameters.

The method of the previous aspect, wherein the operation that obtains the wireless data connection load status of each of a plurality of satellite beams configured to provide wireless data connections obtains the load status indirectly.

The method of any combination of the previous aspects, wherein the load balanced satellite parameters comprise a complete load balanced satellite map program.

The method of any combination of the previous aspects, wherein the wireless data saturation condition is satisfied at least in part based on the number of active wireless data connections with in-flight aircraft.

The method of any combination of the previous aspects, wherein the wireless data saturation condition is satisfied based on the relative number of active wireless data connections compared to other satellite beams in the plurality of satellite beams.

The method of any combination of the previous aspects, wherein the load balanced satellite map parameters are designed to reduce a wireless data connection saturation condition of a satellite beam.

The method of any combination of the previous aspects, wherein the wireless data connection saturation condition includes a hysteresis period for the one or more of the plurality of satellite beams.

The method of any combination of the previous aspects, wherein the load balanced satellite map parameters include desirability values for the plurality of satellite beams, the desirability values being based at least in part on a location of the one or more in-flight aircraft.

The method of any combination of the previous aspects, wherein the load balanced satellite map parameters further include desirability margin values, the desirability margin values being an amount by which a quality of service improvement must exceed before switching satellite beams.

A system for load balancing satellite beams among a plurality of in-flight aircraft comprising: an in-flight aircraft geographic locator configured to collect geographic locations of a plurality of in-flight aircraft; a satellite beam load inspector configured to measure a communications load for each of a plurality of satellite beams; a satellite beam load saturation mitigator configured to: identify one or more satellite beams of the plurality of satellite beams that satisfy a wireless data communication saturation condition; and generate one or more sets of load balanced satellite map parameters configured to modify a satellite map program on-board in-flight aircraft to assemble a load balanced satellite map program; and a data transmitter configured to transmit the at least one of the one or more load balanced satellite map parameters to one or more of the plurality of in-flight aircraft.

The system of the previous aspect, wherein the one or more sets of load balanced satellite map parameters are further configured to mitigate a wireless data connection saturation condition of one of the one or more satellite beams.

The system of any combination of the previous aspects, wherein the satellite beam load saturation mitigator is further configured to generate the one or more sets of load balanced satellite map parameters based at least in part on one of: weather patterns, jet stream perturbations, local traffic, route changes, and seasonal demand.

The system of any combination of the previous aspects, wherein the one or more sets of load balanced satellite map parameters include a satellite beam blacklist.

The system of any combination of the previous aspects, wherein the one or more sets of load balanced satellite map parameters include a relative priority ranking of the plurality of satellite beams.

The system of any combination of the previous aspects, wherein the load balanced satellite map parameters includes instructions to disconnect from a particular satellite beam if an in-flight aircraft is connected thereto.

The system of any combination of the previous aspects, wherein the load balanced satellite map parameters include one or more timestamps specifying time periods during which the satellite map parameters are valid.

A method of selecting a satellite beam, the method comprising: obtaining, at an in-flight aircraft, a satellite map program specifying satellite map parameters for selecting a satellite beam from a plurality of satellite beams; selecting a first satellite beam from the plurality of satellite beams based on the satellite map parameters; opening a wireless data connection over the first satellite beam; receiving, at the in-flight aircraft, via the first satellite beam load balanced satellite map parameters; combining the satellite map program with the load balanced satellite map parameters to output a load balanced satellite map program; selecting a second satellite beam from the plurality of satellite beams based on the load balanced satellite map program; and opening a wireless data connection over the second satellite beam.

The method of the previous aspect, wherein the operations that select the first satellite beam and the second satellite beam based on the load balanced satellite map program are not performed by an on-board modem.

The method of any combination of the previous aspects, wherein the different satellite map parameters constitute a complete load balanced satellite map program.

The method of any combination of the previous aspects, further comprising: discarding the different satellite map parameters after expiration of a time period specified by a timestamp, the timestamp being included in the different satellite map parameters.

What is claimed:

1. A method of load balancing satellite data connections among a group of in-flight aircraft, the method comprising:
    obtaining geographic position data of a plurality of in-flight aircraft;
    obtaining, at an in-flight connectivity network ground station, a respective wireless data connection load status of each of a plurality of satellite beams configured to provide wireless data connections, each of the plurality of in-flight aircraft being configured to connect a respective modem to a respective selected satellite beam of the plurality of satellite beams according to respective satellite map parameters included in a respective on-board satellite map program of the each in-flight aircraft, the respective satellite map parameters indicative of respective weights corresponding to the plurality of satellite beams, and the respective weights corresponding to a respective geographic location of the each in-flight aircraft;
    determining whether one or more of the plurality of satellite beams satisfies a wireless data connection saturation condition; and
    based on the determining operation:
        selecting, by the in-flight connectivity network ground station, one or more in-flight aircraft of the plurality of in-flight aircraft;
        for each of the one or more selected in-flight aircraft, determining, by the in-flight connectivity network ground station, a respective one or more adjustments to the respective satellite map parameters based on the geographic position data of the plurality of in-flight aircraft to generate respective load balanced satellite map parameters, the respective load balanced satellite map parameters being different from the respective satellite map parameters of the respective on-board satellite map program of the each of the selected one or more in-flight aircraft of the plurality of in-flight aircraft; and
        transmitting, by the in-flight connectivity network ground station, to the each of the selected one or more in-flight aircraft of the plurality of in-flight aircraft, the respective load balanced satellite map parameters corresponding to the each of the one or more selected in-flight aircraft.

2. The method of claim 1, wherein obtaining the respective wireless data connection load status of each of the plurality of satellite beams comprises indirectly obtaining the respective wireless data connection load status of each of the plurality of satellite beams.

3. The method of claim 1, wherein the respective load balanced satellite parameters corresponding to the each of the one or more selected in-flight aircraft comprise a respective updated load balanced satellite map program.

4. The method of claim 1, wherein the wireless data saturation condition is satisfied at least in part based on a number of active wireless data connections with in-flight aircraft.

5. The method of claim 1, wherein the wireless data saturation condition is satisfied based on a relative number of active wireless data connections of the one or more of the plurality of satellite beams compared to other satellite beams of the plurality of satellite beams.

6. The method of claim 1, wherein the load balanced satellite map parameters of the one or more selected in-flight aircraft are designed to reduce a wireless data connection saturation condition of a satellite beam included in the one or more of the plurality of satellite beams.

7. The method of claim 1, wherein the wireless data connection saturation condition includes a hysteresis period for the one or more of the plurality of satellite beams.

8. The method of claim 1, wherein the respective load balanced satellite map parameters corresponding to the each of the one or more selected in-flight aircraft comprise include respective desirability values for the plurality of satellite beams, the respective desirability values being based at least in part on respective locations of the one or more selected in-flight aircraft.

9. The method of claim 8, wherein the load balanced satellite map parameters corresponding to the each of the one or more selected in-flight aircraft comprise further include respective desirability margin values, the respective desirability margin values being a respective amount by which a quality of service improvement must exceed before switching satellite beams.

10. A system for load balancing satellite beams among a plurality of in-flight aircraft comprising:
    an in-flight aircraft geographic locator configured to collect geographic locations of a plurality of in-flight aircraft, each in-flight aircraft of the plurality of in-flight aircraft having a respective satellite map program, the respective satellite map program of the each in-flight aircraft including a respective set of satellite map parameters indicative of respective weights of a plurality of satellite beams, and the respective weights corresponding to a respective geographic location of the each in-flight aircraft;

a satellite beam load inspector configured to measure a respective communications load of each satellite beam included in the plurality of satellite beams;

a satellite beam load saturation mitigator configured to:
identify one or more satellite beams of the plurality of satellite beams that satisfy a wireless data communication saturation condition; and
generate one or more sets of load balanced satellite map parameters configured to modify respective satellite map programs on-board in-flight aircraft to assemble respective load balanced satellite map programs, each set of load balanced satellite map parameters indicative of a respective one or more adjustments to a corresponding set of satellite map parameters; and a data transmitter configured to transmit at least one of the one or more sets of load balanced satellite map parameters to one or more of the plurality of in-flight aircraft,
wherein each of the in-flight aircraft geographic locator, the satellite beam load inspector, the satellite beam load inspector, and the satellite beam load saturation mitigator includes respective computer-executable instructions stored on one or more memories of an in-flight connectivity network ground station and executable by one or more processors of the in-flight connectivity network ground station.

11. The system of claim 10, wherein the one or more sets of load balanced satellite map parameters are further configured to mitigate the wireless data connection saturation condition of one of the one or more satellite beams.

12. The system of claim 10, wherein the satellite beam load saturation mitigator is further configured to generate the one or more sets of load balanced satellite map parameters based at least in part on at least one of: weather patterns, jet stream perturbations, local traffic, route changes, or seasonal demand.

13. The system of claim 10, wherein the one or more sets of load balanced satellite map parameters include a satellite beam blacklist.

14. The system of claim 10, wherein the at least one of the one or more sets of load balanced satellite map parameters includes a respective relative priority rankings-of the plurality of satellite beams.

15. The system of claim 10, wherein the one or more sets of load balanced satellite map parameters include instructions to disconnect from a particular satellite beam if an in-flight aircraft is connected thereto.

16. The system of claim 10, wherein the at least one of the one or more sets of load balanced satellite map parameters includes a respective one or more timestamps specifying time periods during which at least some of the respective load balanced satellite map parameters are valid.

17. A method of selecting a satellite beam, the method comprising:
obtaining, at an in-flight aircraft, a satellite map program specifying satellite map parameters for selecting a satellite beam from a plurality of satellite beams, the satellite map parameters indicative of respective weights corresponding to the plurality of satellite beams, and the respective weights corresponding to a respective geographic location of the in-flight aircraft;
selecting a first satellite beam from the plurality of satellite beams based on the satellite map parameters;
opening a wireless data connection over the first satellite beam;
receiving, at the in-flight aircraft via the first satellite beam, load balanced satellite map parameters, the load balanced satellite map parameters indicative of one or more adjustments to the satellite map parameters determined based on geographic position data of the plurality of in-flight aircraft, and the load balanced satellite map parameters indicative of respective updated weights corresponding to the plurality of satellite beams;
combining the satellite map program with the load balanced satellite map parameters to output a load balanced satellite map program;
selecting a second satellite beam from the plurality of satellite beams based on the load balanced satellite map program; and
opening a wireless data connection over the second satellite beam.

18. The method of claim 17, wherein the operation that selects the first satellite beam based on the satellite map parameters and the operation that selects the second satellite beam based on the load balanced satellite map program are not performed by an on-board modem.

19. The method of claim 17, wherein the load balanced satellite map parameters constitute an updated load balanced satellite map program.

20. The method of claim 17, further comprising:
discarding the at least some of the load balanced satellite map parameters after expiration of a time period specified by a timestamp, the timestamp included in the load balanced satellite map parameters.

* * * * *